Sept. 22, 1959  J. K. HUBBARD ET AL  2,905,585
SELF-BONDED PAPER
Filed Sept. 30, 1954

INVENTORS
JAMES K. HUBBARD
FRANKLIN H. KOONTZ
BY Carl A. Hechmer
ATTORNEY

United States Patent Office 2,905,585
Patented Sept. 22, 1959

2,905,585

SELF-BONDED PAPER

James K. Hubbard, West Chester, and Franklin H. Koontz, Marcus Hook, Pa., assignors to E. I. du Pont de Nemours & Company, Wilmington, Del., a corporation of Delaware Application September 30, 1954, Serial No. 459,312

9 Claims. (Cl. 162—157)

This invention relates to a novel article of commerce and to a process for its preparation. More particularly, it is concerned with a paper-like pellicle of a mass of self-bonded, molecularly oriented fiber, produced from a linear synthetic polyester.

The failure of synthetic fibers to replace cellulose to any appreciable extent in the past in the manufacture of paper-like structures, despite the inherent desirable properties of the synthetic fibers such as high wet strength, toughness, chemical durability, excellent dimensional stability and the like, is due largely to two factors, namely, the inability of such synthetic fibers to fibrillate, thus rendering them unsuitable for fabrication upon conventional commercial paper-making equipment and also the inability of prior known methods to adequately bond the reticulated mass without loss of desirable fiber properties such as molecular orientation. For instance it has been common in attempts to produce such structures to heat a batt of synthetic fibers under pressure to fuse the matted fibers at points of intersection. Such a product partakes almost completely of the physical properties of a film of a similar synthetic polymer, the molecular orientation having been largely randomized by the heat and necessary plastic flow. Polymer degradation sometimes occurs. A similar effect is obtained when a batt is bonded by partially dissolving it with a solvent and after application of pressure, evaporating off the solvent. Solvent bonding is particularly poor when applied to fibers and/or filaments of synthetic condensation polymers. Other attempts to form such a product have employed various bonding agents to join the crossed fibers in the matted structure. Such a product is limited in its properties by the chemical and physical characteristics of the bonding agent itself and also the adhesive power of the bond for the fiber. Furthermore, when high temperature is required to apply the bonding agent, molecular alignment of the fibers suffers.

It is an object of the present invention to provide a paper-like pellicle of a self-bonded, molecularly oriented fiber mass produced from a linear synthetic polyester.

Another object is to provide a process for the preparation of such a paper-like pellicle adaptable to conventional paper-making equipment.

These and other objects will become apparent in the course of the folowing specification and claims.

In accordance with the present invention a paper-like pellicle of a mass of self-bonded, molecularly oriented fiber produced from a synthetic, linear polyester is formed by supplying a dilute aqueous solution of a salt from the group consisting of calcium thiocyanate and magnesium thiocyanate (referred to hereinafter as "the thiocyanate salt") to the surface of appropriate fibers and/or filaments prior to matting or in a matted form and pressing the matted structure while heating to remove solvent. The resulting paper-like pellicle is self-bonded, i.e., a true joining of fibers and/or filaments at points of intersection is attained without the presence of an added adhesive. Since the joining occurs at a relatively low temperature, the fibers retain molecular alignment. Furthermore, the action of the join-inducing salt is a surface phenomenon concentrated at the points of contact of the crossing fibers thereby not substantially affecting the greater portion of the fiber structure. After formation, the pellicle may be washed free of the join-inducing salt. The product being unitary, self-bonded and molecularly aligned, is both tough and flexible.

The invention will be more readily understood by reference to the drawings.

Figure 1:
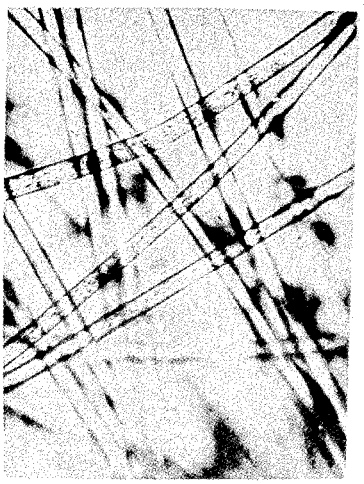
Figure 1 is a photomicrograph of a fragmentary section of a batt of molecularly oriented fibers produced from a polyester polymer.
Figure 2:
Figure 2 is a photomicrograph of a fragmentary section of a paper-like pellicle produced from the mass of fiber of Figure 1 of the present invention.

In Figure 1, a typical section of a batt of randomly disposed polyethyleneterephthalate staple is shown. After treatment of the batt in accordance with the present invention a join of the fibers at their points of intersection occurs by virtue of self-bonding, i.e., without benefit of an adhesive, as is shown in the photomicrograph of Figure 2.

In general the mechanics of the process described herein are analogous to those of paper-making. Thus the process is readily adaptable to conventional paper-making equipment, although not limited thereto. In one embodiment a batt of fibers is formed on a moving screen. Since the fiber stock can be added from a liquid suspension, the Fourdrinier machine is convenient for this operation. The join-inducing salt can be added to the mixer or showered upon the batt after its formation on the endless screen. Adequately heat and pressure for the join occurs within the felt-drying blanket at the dryer rolls. For the production of a low porosity product, additional heat and pressure may be supplied by passing the batt through a heated calender roll. The salt may be removed by a water wash at the usual sizing station or the joined mass may be passed through a wash tank. Manufacture may also be performed on the cylinder paper machine by similar modification.

The aqueous salt solution employed to induce joining of the fibers is applied to the fiber batt at a concentration, which under the conditions of application has little, or preferably no solvent or chemical action upon the fiber. As water is evaporated, the capillary forces at the points of fibre intersection tend to concentrate the salt. Thus when the join is made by application of heat upon the substantially dry batt, the action of the salt is concentrated at the points of crossing and the major length of the fiber is unaffected by concentrated salt solution.

The following examples are cited to illustrate the invention. They are not intended to limit it in any manner.

*Example I*

Three grams of ⅝ inch, 3 denier per filament staple of polyethyleneterephthalate drawn four times its extruded length is suspended in a 6 liter aqueous solution containing 3 grams of sodium carboxymethyl cellulose. The suspension is dispersed on a Rice-Barton "Dyno" pulper having two five-inch concave discs countercurrently stirring at 5000 revolutions per minute at opposite ends of a 5 gallon reservoir. Homogeneity is attained after 2 minutes. Thereafter the aqueous dispersion is filtered over an 8" x 8" square of 80 mesh screen, producing a randomly disposed mat or batt of fibers referred to hereinafter as a "waterleaf." A vacuum of 350 mm. is employed to facilitate moisture removal and to avert bubble entrainment. The waterleaf is gently showered with 20 liters of water to wash out residual sodium carboxymethyl cellulose. 25 cc. of a 10% solution of magnesium thiocyanate in water is showered upon the waterleaf. It is thereafter pressed under a pressure of 200 p.s.i. at 220° C. for a period of 30 seconds, washed with 3 liters of water to remove the thiocyanate salt and air dried. The resulting paper-like pellicle is self-bonded, has a tensile strength of 21.76 pounds per inch and a tear strength of 400 grams and a burst strength of 132 pounds per square inch. All of these tests as well as these reported hereinafter are made by the standard methods reported in TAPPI Standards. A similarly prepared waterleaf upon which bonding is attempted under the same conditions, but without benefit of the magnesium thiocyanate salt, has a tensile strength of 0.2 pound per inch and a burst strength of 7.5 pounds per square inch.

*Example II*

Example I is repeated except that calcium thiocyanate is employed in place of magnesium thiocyanate. An excellent bond is obtained. The resulting paper-like pellicle has a tensile strength of 21.6 pounds per inch, a tear strength of 392 grams and a burst strength of 80 pounds per square inch.

*Example III*

A waterleaf of three grams of ½ inch, 5.3 denier per filament staple of a polyester polymer of diphenylolpropane, isophthalic acid and terephthalic acid (2:1:1), dry spun from a solution of the polymer in methylene chloride and drawn two times its extruded length, is formed on the apparatus described in Example I. A 2% aqueous solution of calcium thiocyanate is showered upon the waterleaf. It is pressed wet at 160° C. for 30 seconds under 200 pounds per square inch pressure. A strong, flexible paper-like pellicle is formed.

*Example IV*

Magnesium thiocyanate is substituted for the calcium thiocyanate of Example III. A similar product is obtained.

*Example V*

A waterleaf of three grams of ½ inch, 10 denier per filament staple of a polyester polymer of resorcinol, isophthalic acid and terephthalic acid (2:1:1), dry spun from a solution of the polymer in chloroform and drawn, is formed on the apparatus described in Example I. A 2% aqueous solution of calcium thiocyanate is showered upon the waterleaf. It is pressed while wet at 100° C. for 30 seconds under 200 pounds per square inch pressure. A strong flexible paper-like pellicle is formed.

A fold endurance rating of about 68,000 is observed when the pellicle of the present invention is tested on an M.I.T. Folding Endurance Tester (manufactured by Tinius Olsen Testing Machine Company of Willow Grove, Pennsylvania). This compares with a rating of about 1200 for a high grade of kraft paper.

The nature of the molecularly oriented polyester fiber employed is not critical. Such materials are well-known in the art and are described in detail in United States Patents 2,465,319, 2,578,899, and 2,604,689. Fibers produced from the linear terephthalate esters composed of recurring structural units of the formula

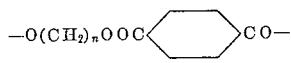

wherein the ring represents the benzene nucleus and $n$ represents an integer within the range of 2 to 10 are preferred.

The method employed in forming the batt is not critical. It is not necessary that the molecularly oriented fibers be suspended in a liquor and beaten prior to batt formation since adherence among the fibers does not depend on fibrillation as is the case in cellulose paper manufacture. However to attain uniform distribution it is convenient to suspend a known weight of fibers or the like in a measured quantity of liquid and agitate. Machines used in paper-making such as the Hollander Beater, the Tugboat Pulper, jordens and the like are all suitable. To assist dispersion the viscosity of the liquid may be raised. This may be accomplished by supplying an additive to water such as sodium carboxymethyl cellulose, partially hydrolyzed polyvinyl acetate (such as "Elvanol 72–51" manufactured by E. I. du Pont de Nemours & Company of Wilmington, Delaware) the condensation product of ethanolamine with mixed long chain acids (such as "Ninol 2012A," manufactured by Ninol Laboratories of Chicago, Illinois), or the like, or by employing a high viscosity liquid such as glycerine, ethylene glycol, t-butyl alcohol or the like. The optimum viscosity will vary with the type of mixing or beating, the fiber denier, and similar factors. In choosing the suspending media and thickener, therefore, care must be exercised to avoid substances which cannot be subsequently removed from the formed batt with ease since certain foreign substances such as for instance sodium carboxymethyl cellulose, even in minute concentrations, have been found to interfere with the formation of the join. In batt formation from a liquid suspension the use of staple having a length below about 1 inch with a denier per filament within the range of from about 1/10 to about 6 is preferred. However these values may vary. Fibers of mixed length and denier are suitable. Fibers as short as 3/16 inch are satisfactory. Instead of laying the batt from liquid suspension, staple, fiber or filament in wet or dry condition may be blown or dropped upon a surface, or a continuous filament may be cross lapped on a surface. The funicular structure may be crimped or uncrimped and of circular or irregular cross section.

The thiocyanate salt may be applied to the funicular feed at any stage prior to the joining step. It is sometimes convenient to add it to the beater in which the batt-forming fibers are suspended. When it is desirable to wash the batt after its formation, the salt may be added after the wash step. As previously described, the salt containing solution applied to the batt or leaf is sufficiently dilute to avoid any substantial degradation and/or solution of the fiber structure. The maximum concentration will vary according to the salt employed and the conditions under which it is applied. In general a salt solution sufficient to deposit at least about 10% by weight of salt based on the fabric weight is desirable. A batt wherein salt constitutes by weight of from about 20% to about 30% is preferred.

The join step is generally accomplished by pressing the batt of fiber bearing the thiocyanate salt at elevated temperature. The optimum temperature will vary with the salt used, the amount of salt employed, the pressure upon the batt and the period of exposure. For a contact period of about thirty seconds a temperature within the range of from about 90 to about 240° C. is usually adequate. While longer heating periods when operating within this temperature range may be employed without deleterious effects, short periods of three minutes or less are preferred to facilitate commercial operations. Temperatures sufficient to induce molecular randomization cause a weakening of the product and loss of flexibility. For the production of a high strength, hard surface paper-like pellicle, a pressure within a range of from about 50 to about 200 pounds per square inch is usually employed.

After the join is complete, the thiocyanate salt is washed from the self-bonded coherent mass. The product is a tough, flexible, coherent paper-like pellicle. It is useful in the making of paper money, as a filter medium, as a non-woven fabric, in the manufacture of reinforced plastic, as body armor, condenser paper, in high frequency electronic circuits, printed electrical circuits, stencils, permanent ledger, wall-paper and the like. While the invention has been exemplified in the production of flat structures, it is obvious that shaped articles may be similarly formed by depositing the batt or leaf over a form and thereafter applying the necessary heat and pressure. Thus seamless cones, bags, apparel and the like may be made.

The following example is cited to illustrate utility.

*Example VI*

The pellicle produced in accordance with the directions of Example I is folded into conical shape and employed to remove suspended solids from a 10% aqueous sodium hydroxide solution. Filtration is rapid. No deleterious effect upon the folded pellicle is observed.

In summary the process of the present invention comprises heating to a temperature within a range of from about 90° C. to about 240° C. a batt of a molecularly oriented fiber produced from a linear, synthetic polyester, the said batt bearing at the points of fiber intersection a salt from the group consisting of calcium thiocyanate and magnesium thiocyanate, which salt is originally applied to the said fiber at a concentration at which it is substantially innocuous to the said fiber. The product may be conveniently defined as a paper-like pellicle of a mass of self-bonded, molecularly oriented fiber produced from a linear, synthetic polyester, the said fiber bridged between points of fiber intersection possessing substantially its "as-formed" characteristics.

Many equivalent modifications within the inventive concept will be apparent to those skilled in the art from a reading of the foregoing description without a departure from the inventive concept.

What is claimed is:

1. A synthetic paper sheet composed of a batt consisting essentially of a mass of reticulated molecularly oriented fiber, the said fiber being composed of a fiber-forming linear synthetic polyester wherein recurring ester linkages are an integral part of the polymer chain, the said fibers being self-bonded only at the points where the fibers intersect each other, the self-bond having been accomplished by a solution of a join-inducing salt from the group consisting of calcium thiocyanate and magnesium thiocyanate, the said solution having been originally applied to the said fiber at a concentration at which it is substantially innocuous to the said fiber and thereafter having been heated to increase its concentration, those portions of the fibers between the points of fiber intersection possessing substantially the same physical and chemical characteristics as they possessed prior to the formation of the bonds.

2. The sheet of claim 1 wherein the polyester is a terephthalate.

3. The sheet of claim 2 wherein the polyester is polyethyleneterephthalate.

4. A process of making a high strength paper-like pellicle of a mass of self-bonded, molecularly oriented fiber produced from a linear, synthetic polyester which comprises pressing at a temperature within a range of from about 90° C. to about 240° C. a batt of the said fiber wherein a solution of a salt from the group consisting of calcium thiocyanate and magnesium thiocyanate has been concentrated at the point of fiber intersection, the said solution being originally applied to the said fiber at a concentration at which it is substantially innocuous to the said fiber.

5. The process of claim 4 wherein the solution of thiocyanate salt is applied to the fiber prior to batt formation.

6. The process of claim 4 wherein the solution of thiocyanate salt is applied to the fiber after batt formation.

7. The process of claim 4 wherein the heating is performed with the batt under a pressure of from about 50 to about 200 pounds per square inch.

8. The process of claim 7 wherein the thiocyanate salt is magnesium thiocyanate.

9. The process of claim 7 wherein the thiocyanate salt is calcium thiocyanate.

References Cited in the file of this patent

UNITED STATES PATENTS

| | | |
|---|---|---|
| 2,325,302 | Britt | July 27, 1943 |
| 2,336,797 | Maxwell | Dec. 14, 1943 |
| 2,338,602 | Schur | Jan. 4, 1944 |
| 2,357,392 | Francis | Sept. 5, 1944 |
| 2,374,540 | Hall | Apr. 24, 1945 |
| 2,436,222 | Neal et al. | Feb. 17, 1948 |
| 2,439,514 | Herndon | Apr. 19, 1948 |
| 2,465,319 | Whinfield et al. | Mar. 22, 1949 |
| 2,522,527 | Manning | Sept. 19, 1950 |
| 2,526,125 | Francis | Oct. 17, 1950 |
| 2,578,899 | Pace | Dec. 18, 1951 |
| 2,604,689 | Hebeher | July 29, 1952 |
| 2,626,214 | Osborne | Jan. 20, 1953 |
| 2,676,128 | Piccard | Apr. 20, 1954 |
| 2,689,199 | Pesce | Sept. 24, 1954 |
| 2,725,309 | Rodman | Nov. 29, 1955 |
| 2,734,001 | Mecklenburgh | Feb. 7, 1956 |

FOREIGN PATENTS

| | | |
|---|---|---|
| 610,171 | Great Britain | Oct. 12, 1948 |